United States Patent [19]
Wakahara

[11] Patent Number: 5,361,651
[45] Date of Patent: Nov. 8, 1994

[54] SHIFT CONTROL SYSTEM FOR AUTOMATIC TRANSMISSION

[75] Inventor: Tatsuo Wakahara, Kanagawa, Japan

[73] Assignee: Nissan Motor Co., Ltd., Yokohama, Japan

[21] Appl. No.: 932,555

[22] Filed: Aug. 20, 1992

[30] Foreign Application Priority Data

Sep. 4, 1991 [JP] Japan .................. 3-224294

[51] Int. Cl.⁵ .................................... F16H 61/06
[52] U.S. Cl. .................................... 477/130
[58] Field of Search .................................... 74/869

[56] References Cited

U.S. PATENT DOCUMENTS

| | | | |
|---|---|---|---|
| 3,707,891 | 1/1973 | Asano et al. | 74/869 |
| 4,106,369 | 8/1978 | Taga | 74/869 |
| 4,334,441 | 6/1982 | Iwanaga et al. | 74/869 X |
| 4,422,353 | 12/1983 | Suga et al. | 74/869 X |
| 4,935,872 | 6/1990 | Benford et al. | 364/424.1 |
| 5,033,330 | 7/1991 | Okahara | 74/869 X |

FOREIGN PATENT DOCUMENTS 63-235728 9/1988 Japan .
1-80853 5/1989 Japan .

OTHER PUBLICATIONS

Maintenance Manual for Nissan RE4F02A type Automatic Trans-axle, pp. 1-24, 1988.
"Nissan Repair Manual, Nissan Automatic Transaxle RL4F03A Type", p. A-2, May 1989.
Nissan Repair Manual (L4N71B and E4N71B), 1982, p. 7.
Toyota Repair Manual (A340E), 1985.
Toyota Repair Manual (A540H).
Jaguar XJ6 Repair Manual (ZF4HP-22), p. 44-2.

*Primary Examiner*—Dirk Wright
*Attorney, Agent, or Firm*—Foley & Lardner

[57] ABSTRACT

A shift control system comprises duty solenoid valves by which engagement pressure of one friction element to be released and that one of the other friction element to be engaged can be controlled individually.

6 Claims, 5 Drawing Sheets

DURING NORMAL UPSHIFT CHANGE SPEED

DURING NORMAL UPSHIFT CHANGE SPEED

SHIFT CONTROL SYSTEM FOR AUTOMATIC TRANSMISSION

BACKGROUND OF THE INVENTION

The present invention relates to a shift control system for an automatic transmission.

The automatic transmission is shiftable in speed ratio by selecting a predetermined speed by selective hydraulic actuation of friction elements such as a clutch and a brake to change the friction elements to be operated.

Accordingly, some types of shifting necessitate redeployment of the friction elements such that one friction element or high clutch is engaged whereas the other friction element or band brake is released, as is seen during a 2-3 shift of the automatic transmission described in a Maintenance Manual for NISSAN FE4F-02A type Automatic Trans-axle, published by NISSAN MOTOR CO. LTD., in March, 1988. Such shifting by redeployment of the friction elements as represented by the automatic transmission described in the above-mentioned document is ensured by a structure as shown in FIG. 6.

Referring to FIG. 6, H/C designates a high clutch, B/B designates a band brake, 1 designates 1-2 shift valve, 2 designates a 2-3 shift valve, and L/C designates a low clutch. With the shift valves 1, 2 turned off as illustrated in FIG. 6, the high clutch H/C and the band brake B/B are both released, and only the low clutch L/C is engaged, selecting first speed. In that state, if the 1-2 shift valve 1 is turned on, the band brake B/B is supplied with line pressure $P_L$ as engagement pressure $P_{B/A}$ to produce engagement thereof. This additional actuation of the band brake B/B causes the automatic transmission to have an upshift change of speed from first to second speed.

In that state, if the 2-3 shift valve 2 is also turned on, line pressure $P_L$ is supplied to the high clutch H/C as engagement pressure $P_{H/C}$, and to the band brake B/B as release pressure $P_{B/R}$. Pressure $P_{H/C}$ engages the high clutch H/C, and pressure $P_{B/R}$ releases the band brake B/B due to a large pressure acting area thereof in spite of the existence of engagement pressure $P_{B/A}$. Thus, redeployment of the friction elements is accomplished such that the high clutch H/C is engaged whereas the band brake B/B is released, which causes the automatic transmission to have an upshift change of speed from second to third speed.

With the known control circuit for redeployment of the friction elements, assuming that an engagement pressure acting area of the band brake B/B is $A_A$, a release pressure acting area thereof is $A_R$, and a force of a return spring is $F_S$, the balance of forces of the band brake B/B is expressed by the following equation:

$$P_{B/A} \cdot A_A = P_{B/R} \cdot A_R + F_S$$

Accordingly, the release pressure Phd B/R of the band brake B/B is expressed:

$$P_{B/R} = (P_{B/A} \cdot A_A - F_S)/A_R \qquad (1)$$
$$= (P_L \cdot A_A - F_S)/A_R$$

It will be understood that since the band brake B/B is released when $P_{B/R}$, i.e., the engagement pressure $P_{H/C}$ of the high clutch H/C, is equal to a value given by the equation (1), an engagement timing of the high clutch H/C and a release timing of the band brake B/B cannot be controlled individually. As a result, the two timings cannot be adjusted properly or at desired settings in accordance with the cruising condition and specification of a vehicle.

It is, therefore, an object of the present invention to provide a shift control system for an automatic transmission which can properly adjust an engagement timing of one friction element and a release timing of the other friction element without producing interlock of the automatic transmission.

SUMMARY OF THE INVENTION

According to one aspect of the present invention, there is provided a shift control system for an automatic transmission, the automatic transmission having a first friction element undergoing a first pressure and a second friction element undergoing a second pressure, the shift control system comprising:

a pressure source;

a first passage defining means for fluidly connecting said pressure source to the first friction element;

a second passage defining means for fluidly connecting said pressure source to the second friction element;

a third passage defining means for fluidly connecting the second friction element to said first passage defining means;

a first control means for controlling the first pressure of the first friction element; and a second control means for controlling the second pressure of the second friction element.

According to another aspect of the present invention, there is provided, in an automotive vehicle:

a pressure source;

a first friction element undergoing a first pressure;

a second friction element undergoing a second pressure;

a first passage defining means for fluidly connecting said pressure source to said first friction element;

a second passage defining means for fluidly connecting said pressure source to said second friction element;

a third passage defining means for fluidly connecting said second friction element to said first passage defining means;

a first control means for controlling said first pressure of said first friction element; and a second control means for controlling said second pressure of said second friction element.

DETAILED DESCRIPTION OF THE INVENTION

Figure 1:
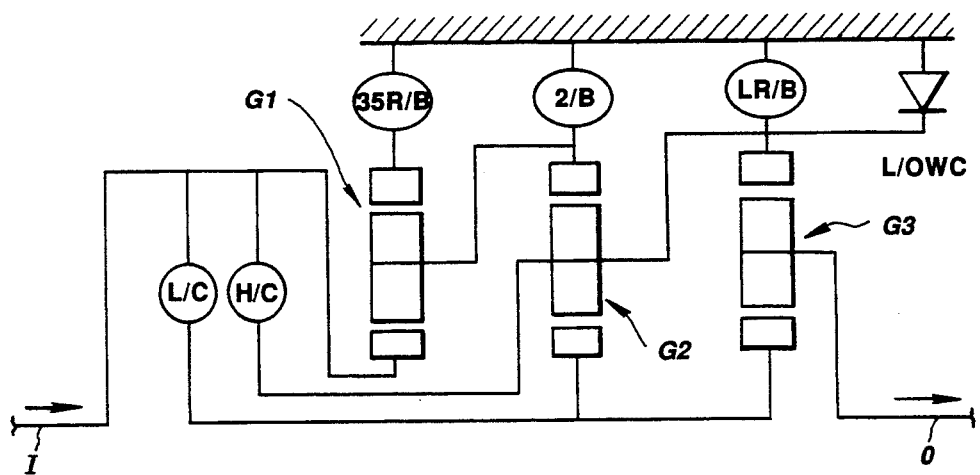
FIG. 1A is a skeleton drawing showing a gear train of an automatic transmission to which the present invention is applied.
FIG. 1B is a table showing an engagement logic of friction elements.
FIG. 1C is a table similar to FIG. 1B, further with chambers of the friction elements.

Referring to the drawings, a preferred embodiment of the present invention will be described.

Referring first to FIG. 1A, a gear train of an automatic transmission comprises first, second and third planetary gear sets G1, G2, G3 which are coaxially disposed between input and output shafts I, O, and which are simple planetary gear sets having first, second and third sun gears, first, second and third ring gears, and first, second and third carriers, respectively. The first sun gear is connected to the input shaft I, and the second and third sun gears are connectable to the input shaft I by a low clutch L/C, and the second carrier is connectable thereto by a high clutch H/C. The first carrier and the second ring gear are integrally connected to each other an are fixable by a second brake 2/B, and the first ring gear is fixable by a third speed/fifth speed/reverse band brake 35R/B. Additionally, the second carrier and the third ring gear are integrally connected to each other, are fixable by a low reverse brake LR/B, and prevented by a low on-way clutch L/0WC from rotating in the direction opposite to the input shaft I.

Referring to FIG. 1B, such a gear train can select between a forward first speed to a fifth speed and reverse by selecting corresponding a combination of engaged friction element(s) (cell with a circle) and released friction element(s) (cell with a void). Referring to FIG. 1C, a cell with a circle indicates a chamber of each friction element to be supplied with hydraulic fluid for obtaining engagement and disengagement thereof. It is to be noted that, in the engagement logic tables in FIGS. 1B and 1C, a cell with a triangle indicates a friction element or a chamber which is unconcerned with a selection of the speed, but which is to be engaged or supplied with hydraulic fluid for the purpose which will be described hereinafter.

Figure 2:
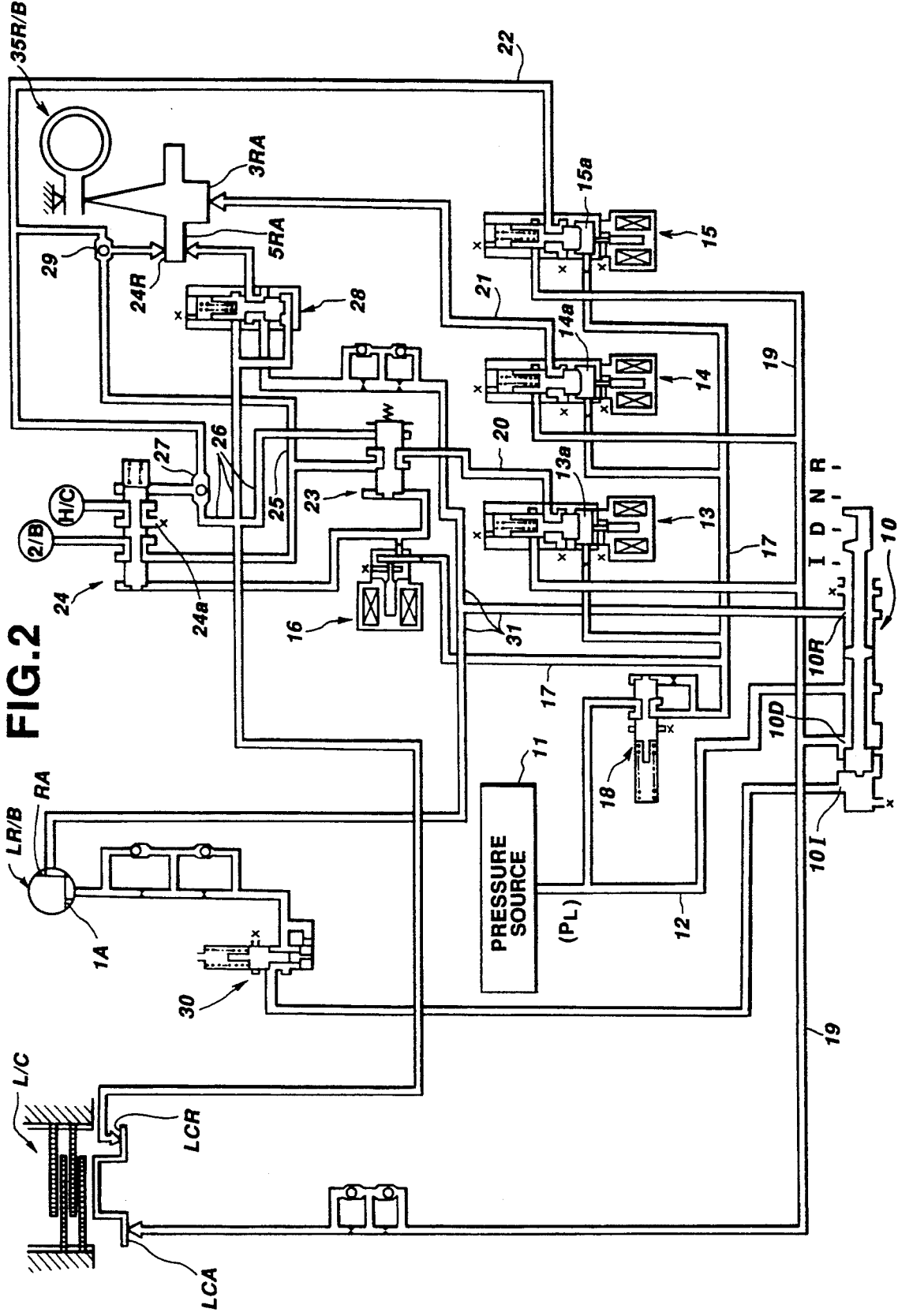
FIG. 2 is a circuit diagram showing a shift control hydraulic circuit of the gear train.

Referring to FIG. 2, there is shown a shift control hydraulic circuit for the gear train in FIG. 1A, by which an engagement logic in FIGS. 1B and 1C is achieved. Numeral 10 designates a manual valve having forward automatic change speed range (D range) as illustrated in FIG. 2, first speed engine brake range (I range). stop range (N range), and reverse range (R range) which are manually established by a driver in accordance with a desired cruising pattern. It is to be noted that the manual valve 10 also has parking range (P range) and second engine brake range (II range), which are omitted here as failing to have a connection with the present invention.

The manual valve 10 provides to ports line pressure $P_L$ built up in a pressure source 11 and output to a circuit 12 in accordance with a selected range: a port 10D in D range, ports 10D, 10I in I range, and a port 10R in R range. In N range, the line pressure circuit 12 does not communicate with any of the ports, and all the ports are drained off.

Numerals 13, 14, 15 designate first, second and third duty solenoid valves, respectively, and 16 designates a solenoid selector valve. These valves 13-16 are supplied with constant pilot pressure via a circuit 17. This pilot pressure is produced by reducing .line pressure $P_L$ to a predetermined value in a pilot valve 18.

Additionally, the duty solenoid valves 18, 14, 15 are connected to a forward pressure circuit 19 which in turn communicates with an apply chamber LCA of the low clutch L/C.

At 0% in duty, the duty solenoid valves 13, 14, 15 preserve positions as illustrated in FIG. 2 wherein pilot pressure within chambers 13a, 14a, 15a is all drained off to achieve drainage of circuits 20, 21, 22. As the duty is increased to 100%, pressure within the chambers 13a, 14a, 15a is built up to the same value as pilot pressure so as to achieve buildup of pressure within the circuits 20, 21, 22 up to the same value as the line pressure within the forward pressure circuit 19.

In the ON state, the solenoid selector valve 16 supplies pilot pressure within the circuit 17 to selector valves 23, 24 so as to cause rightward displacement as viewed in FIG. 2, whereas in the OFF state, the solenoid selector valve 16 puts the selector valves 23, 24 in positions as illustrated in FIG. 2. The selector valve 23 allows communication of the circuit 20 with a circuit 25 in the position as illustrated in. FIG. 2, whereas the selector valve 25 allows communication of the circuit 20 with a circuit 26 upon rightward displacement. The selector valve 24 allows communication of the second brake 2/B with the circuit 25, and the high clutch H/C with a drain port 24a in the position as illustrated in FIG. 2, whereas the selector valve 24 allows communication off the second brake 2/B with the drain port 24a, and the high clutch H/C with an output port of a shuttle valve 27 upon rightward displacement.

The shuttle valve 27 has one input port connected to the circuit 26 which also communicates with a fifth speed and reverse apply chamber 5RA of the band brake 35R/B via a release chamber LCR of the low clutch L/C and a selector valve 28. The shuttle valve 27 has the other input port connected to the circuit 22. The circuits 22, 25 communicate with a second and fourth speeds release chamber 24R of the band brake 35R/B via a shuttle valve 29, and the circuit 21 is connected to a third speed and reverse apply chamber 3RA of the band brake 35R/B.

The port 10I of the manual valve 10 is connected to a first speed apply chamber 1A of the low reverse brake LR/B via an I range pressure reducing valve 30.

The port 10R of the manual valve 10 is connected to a reverse apply chamber RA of the low reverse brake LR/B via a circuit 31, and to a fifth speed and reverse apply chamber 5RA of the band brake 35R/B via the selector valve 28.

Next, the operation of this embodiment will be described. In N range of the manual valve 10, line pressure within the circuit 12 is not output to any of the ports 10D, 10I, 10R, and all the ports are drained off. As a result, all the friction elements are out, of operation or released, so that the automatic transmission fails to perform power transmission between the input and output shafts I, O, keeping a vehicle at a standstill.

In first speed: When the manual valve 10 is put in D range in accordance with a driver's request for forward cruising, line pressure within the circuit 12 is output to the port 10D. This line pressure out of the port 10D comes to the apply chamber LCA of the low clutch L/C via the circuit 19, engaging this clutch L/C. On the other hand, when the cruising condition forces a selection of first speed, a computer (not shown) puts the duty solenoid valves 13, 14, 15 at 0% in duty, and turns off the solenoid selector valve 16. Thus, since the circuits 20, 21, 22 are out pressure, and the selector valves 23, 24 are positioned as illustrated in FIG. 2, the release chamber LCR of the low clutch L/C, the second brake 2/B, the high clutch H/C, and all the chambers 3RA, 5RA, 24R of the band brake 35R/B are drained off. Accordingly, the automatic transmission has only low clutch L/C engaged, selecting first speed.

In first speed: the gear train as shown in FIG. 1 cannot obtain engine brake due to existence of the low one-way clutch L/OWC. If engine brake is needed in first speed, the driver puts the manual valve 10 in I range to output line pressure from not only the port 10D, but the port 10I. At that time, line pressure out of the port 10I comes to a chamber 1A of the low reverse brake LR/B via the reducing valve 30 (see FIG. 1C, a corresponding cell with a triangle), producing additional actuation of this brake LR/B, thus enabling engine brake in first speed.

In second speed: When, in D range, first speed, the cruising condition forces a selection of second speed, the computer gradually increases the duty of the first duty solenoid valve 13 to produce and gradually increase pressure within the circuit 20. This pressure comes to the second brake 2/B via the selector valves 23, 24 to gradually engage the former, enabling upshift change speed from first to second speed without a shock.

Engagement pressure of the second brake 2/B comes to the release chamber 24R of the band brake 35 R/B via the shuttle valve 29 (see FIG. 1C, corresponding cells with a triangle), prohibiting engagement of the band brake 35R/B in cooperation with a return spring. As a result, even if the duty solenoid valve 14 produces pressure in the circuit 21 due to failure of a control system, the band brake 35R/B cannot be engaged, avoiding impossible cruising due to interlock of the automatic transmission.

In third speed: When, in second speed, the cruising condition forces a selection of third speed, the computer gradually decreases the duty of the first duty solenoid valve 13 to reduce pressure within the circuit 20 or second brake 2/B, whereas it gradually increases the duty of the second duty solenoid valve 14 to produce and gradually increase pressure within the circuit 21 or chamber 3RA of the band brake 35R/B. This causes redeployment of the friction elements such that the second brake 2/B is released whereas the band brake 35R/B is engaged, enabling an upshift change of speed from second to third speed.

Since, during this shifting, engagement pressure of the second brake 2/B to be released, and the engagement pressure of the band brake 35R/B to be engaged are controlled individually by the duty solenoid valves 13, 14, the release timing of the second brake 2/B, and engagement timing of the band brake 35R/B can be adjusted properly and freely in accordance with the cruising condition and specification of the vehicle.

Figure 3:
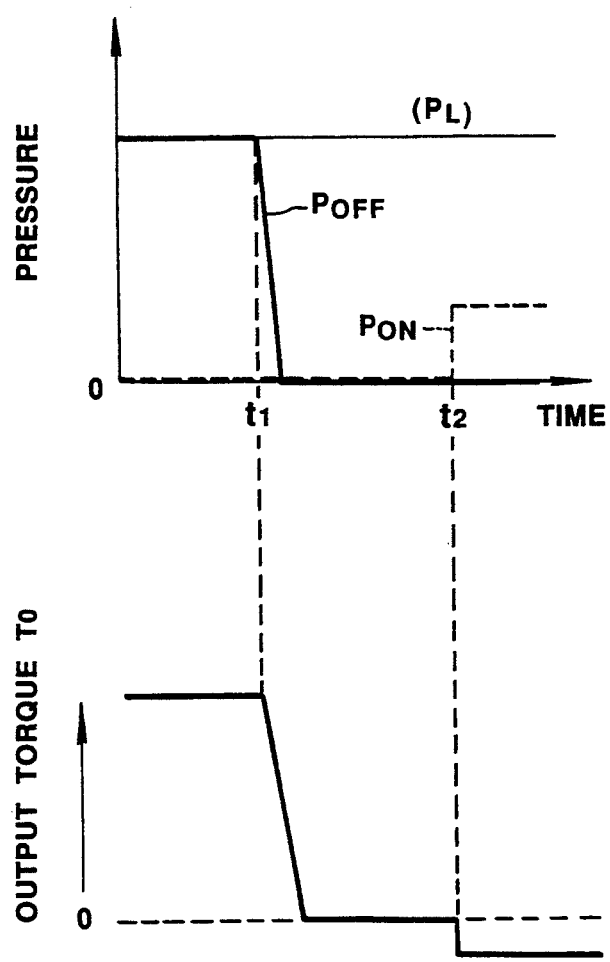
FIG. 3 is a time chart showing a preferred operation during an upshift change of speed with a foot removed.

Referring to FIG. 3, during an upshift change of speed with a foot removed, i.e., upshift change speed produced by removing a foot from an accelerator pedal, it is preferable, in view of a desirable waveform of a transmission output torque $T_0$, to decrease engagement pressure of the friction elements to be released (in this case, the second brake 2/B) from a shift Start instant $t_1$ in a manner as indicated by $P_{OFF}$, but increase engagement pressure of the friction elements to be engaged (in this case, the band brake 35R/B) at a synchronism detection instant $t_2$ by a turbine sensor in a manner as indicated by $P_{ON}$, and put the upper limit value thereof lower than line pressure $P_L$. On the other hand, referring to FIG. 4, during normal upshift change speed, it is preferable, in view of a desirable waveform of the transmission output torque $T_0$, to decrease engagement pressure of the friction elements to be released also from the shift start instant $T_1$ in a manner as indicated by $P_{OFF}$, but increase engagement pressure of the friction elements to be engaged immediately after the shift start instant $t_1$ in a manner as indicated by $P_{ON}$, and bring engagement pressure to the same value as line pressure $P_L$ after preserving a shelf pressure state for a while.

As described above, even if a preferred pressure control form varies according to the cruising conditions, all the requirements of every cruising condition can be met by individual control of a pressure decrease function of the first solenoid valve 13 and a pressure increase function of the second solenoid valve 14.

Figure 5:
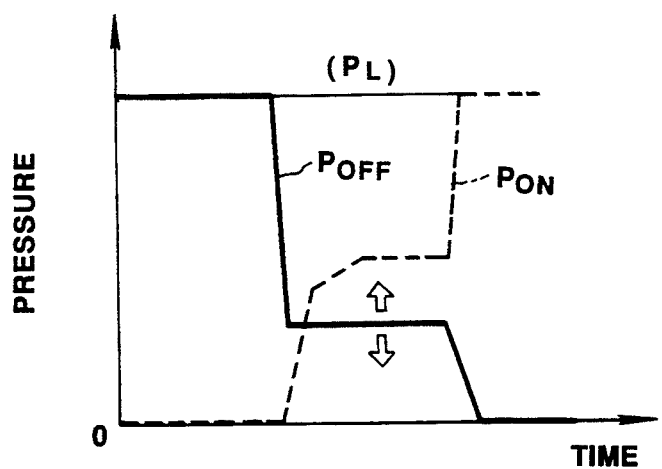
FIG. 5 is a chart similar to FIG. 4, showing another preferred operation during a normal upshift change of speed.
Figure 6:
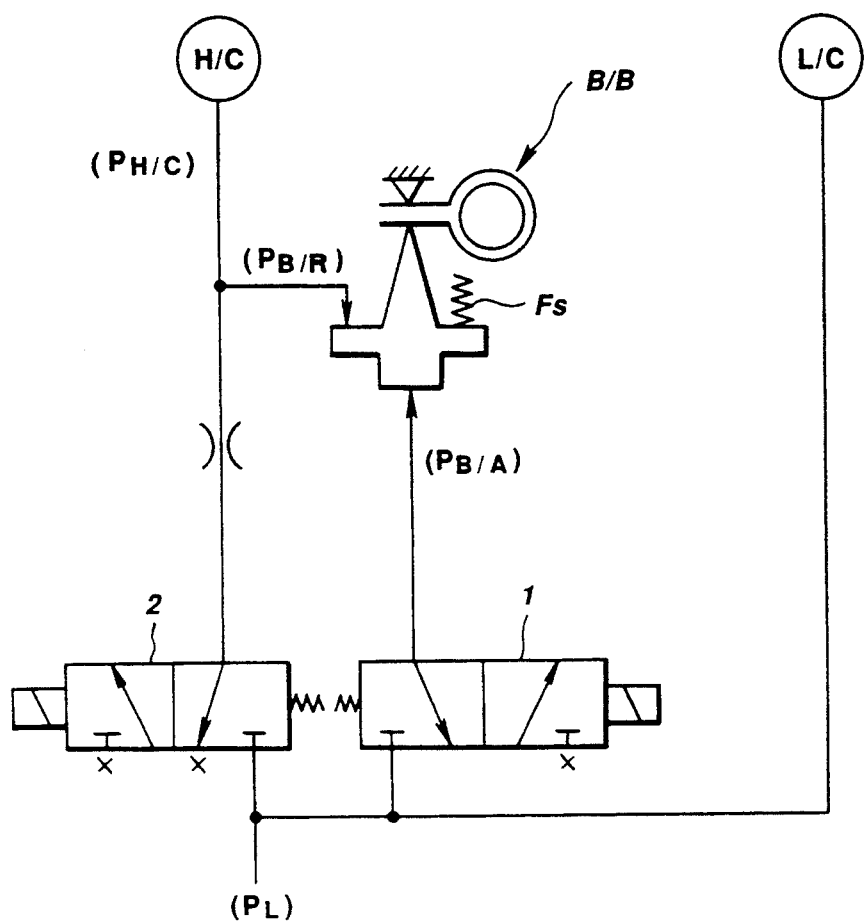
FIG. 6 is a fragmentary circuit diagram showing a known shift control system.

Further, referring to FIG. 5, during normal upshift change speed, it is also possible, by establishing a shelf pressure state of engagement pressure $P_{OFF}$ of the friction elements to be released and changing a level of shelf pressure as indicated by void arrows, to meet the requirements for obtaining rather engine racing shifting, or rather interlock shifting. In addition, this shelf pressure can easily be controlled on results of learning, or as a function of pressure $P_{ON}$.

In fourth speed: When, in third speed, the cruising condition forces a selection of fourth speed, the computer turns on the solenoid selector valves 16 to switch the selector valves 23, 24 in the rightward position as viewed in FIG. 2 by the pilot pressure of the circuit 17. At the same time, it gradually decreases the duty of the second duty solenoid valve 14 to reduce pressure within the circuit 21 (pressure within the apply chamber 3RA of the band brake 35R/B), and gradually increases the duty of the third duty solenoid valve 15 to obtain a gradual increase in pressure within the circuit 22 (engagement pressure coming to the high clutch H/C via the shuttle valve 27 and the selector valve 24). This causes redeployment of the friction elements such that the band brake 35R/B is released whereas the high clutch H/C is engaged, thereby enabling an upshift change of speed from third to fourth speed.

Figure 4:
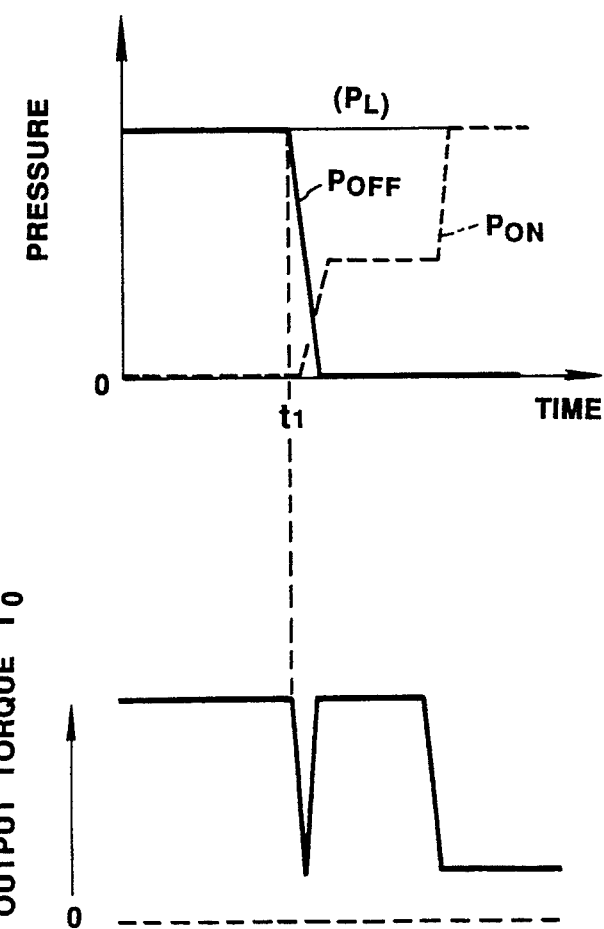
FIG. 4 is a chart similar to FIG. 3, showing a preferred operation during a normal upshift change of speed.

Since, during this shifting also, engagement pressure within the chamber 35A of the band brake 35R/B is to be released, and one of the high clutch 25 H/C to be engaged are controlled individually by the duty solenoid valves 14, 15, the same effect as during 2–3 shift as described in connection with FIGS. 3–5 can be expected.

Engagement pressure of the high clutch H/C within the circuit 22 comes to the release chamber 24R of the band brake 35R/B via the shuttle valve 29 (see FIG. 1C, corresponding cells with a triangle), prohibiting engagement of the band brake 35R/B in cooperation witch the return spring. As a result, even if the duty solenoid valve 14 produces pressure in the circuit 21 due to failure of the control system, the band brake 35R/B cannot be engaged, thereby avoiding interlock of the automatic transmission.

In fifth speed: When, in fourth speed, the cruising condition forces a selection of fifth speed, the computer decreases the duty of the third duty solenoid valve 15 to reduce pressure within the circuit 22, and increases the duty of the first duty solenoid valve 13 to obtain an increase in pressure within the circuit 20. A decrease in pressure within the circuit 22 allows the high clutch H/C to release, whereas pressure within the circuit 20 comes to the high clutch H/C via the selector valve 23, the shuttle valve 27, the circuit 26, and the selector valve 24, keeping the high clutch H/C engaged. Pressure directed to the circuit 26 also comes to the release chamber LCR of the low clutch L/C, releasing the same due to a pressure acting area of the chamber LCR which is larger than a pressure acting area of the chamber LCA. Additionally, pressure within the circuit 20 comes to the apply chamber 5RA of the band brake 35R/B via the selector valve 28, and the release chamber 24R of the band brake 35R/B is drained off due to a decrease in pressure within the circuit 22, achieving engagement of the band brake 35R/B. This allows the automatic transmission to cause an upshift change of speed from fourth to fifth speed.

Likewise, 5–4, 4–3, 3–2, and 2–1 downshift changes of speed can be achieved by the corresponding control of the duty solenoid valves 13, 14, 15, and the solenoid selector valves 16 in a predetermined manner. In such downshift changes of speed, wherein a decrease and an increase in engagement pressure of the friction elements to be redeployed by the duty solenoid valves 13, 14, 15 is controllable individually, the same effect as the one during a 2–3 shift as described in connection with FIGS. 3–5 can be expected.

Reverse: When the manual valve 10 is put in R range in accordance with a driver's request for reverse, line pressure $P_L$ within the circuit 12 is output to the circuit 31 from the port 10R, and the other ports are all drained off. Basically, the computer puts the duty solenoid valves 13, 14, 15 at 0% in duty to obtain a non-pressure state of the circuit 20, 21, 22, and the solenoid selector valve 16 is turned off to position the selector valves 23, 24 as illustrated in FIG. 2.

Pressure within the circuit 31 comes to the apply chamber RA of the low reverse brake LR/B to engage the same on the one hand, and comes to the apply chamber 5RA of the band brake 35R/B via the selector valve 28 to engage the same on the other hand. This allows the automatic transmission to select reverse.

A greater brake capacity of the band brake 35R/B is desirable upon, e.g., a quick depression of the accelerator pedal. In that case, the computer increases the duty of the second duty solenoid valve 14 to produce pressure within the circuit 21 (see FIG. 1C, corresponding cells with a triangle). This pressure comes to the chamber 3RA to enlarge the engaging force of the band brake 35R/B, and to improve the brake capacity thereof as requested.

What is claimed is:

1. In an automotive vehicle having an automatic transmission:
    a pressure source;
    a first friction element undergoing a first pressure;
    a second friction element undergoing a second pressure;
    means for making said first pressure act on said second friction element in such a direction as to disengage said second friction element;
    a first passage fluidly connecting said pressure source to said first friction element;
    a second passage fluidly connecting said pressure source to said second friction element;
    a third passage fluidly connecting said making means to said first passage;
    a first control means for controlling said first pressure; and
    a second control means for controlling said second pressure;
    wherein the automatic transmission undergoes a shift by engaging said first friction element by said first pressure and disengaging said second friction element by a decrease of said second pressure.

2. An automatic vehicle as claimed in claim 1, wherein said making means includes a pressure acting surface of said second friction element.

3. An automatic vehicle as claimed in claim 1, wherein said first and second control means each include a duty solenoid valve.

4. A shift control system for an automatic transmission comprising:
    a first friction element;
    a second friction element;
    a first pressure line;
    a second pressure line;
    a pressure source operatively connected to said first and second friction elements by said first and second pressure lines, respectively, such that first and second pressures are respectively applied to said first and second friction elements;
    means for applying said first pressure to said second friction element in a direction which acts to prevent engagement of said second friction element, said applying means including a third pressure line connecting said applying means to said first pressure line;
    first regulating means for regulating a level of said first pressure; and
    second regulating means for regulating a level of said second pressure;
    wherein when said automatic transmission undergoes a shift due to the level of said first pressure being increased by said first regulating means to force engagement of said first friction element, the level of said second pressure is concurrently decreased by said second regulating means such that said second friction element is disengaged due to a difference between the level of pressure applied to said second friction element by said second pressure and the level of pressure applied to said second element by said first pressure.

5. A shift control system for an automatic transmission as claimed in claim 4, further comprising a spring which applies a biasing force in said direction.

6. A shift control system for an automatic transmission as claimed in claim 4, wherein said first pressure acts on said second element in direct opposition to said second pressure.

* * * * *